United States Patent [19]

Cage

[11] Patent Number: 5,193,391
[45] Date of Patent: Mar. 16, 1993

[54] CONTROLLED VIBRATION ANGULAR RATE SENSOR

[76] Inventor: Donald R. Cage, 6 Placer Ave., Longmont, Colo. 80501

[21] Appl. No.: 613,162

[22] Filed: Nov. 14, 1990

[51] Int. Cl.⁵ ............................................. G01P 9/04
[52] U.S. Cl. ............................................................ 73/505
[58] Field of Search ............................................. 73/505

[56] References Cited

U.S. PATENT DOCUMENTS

| | | | |
|---|---|---|---|
| Re. 22,409 | 12/1943 | Lyman | 73/505 |
| Re. 32,931 | 5/1989 | Staudte | 73/505 |
| 2,544,646 | 3/1951 | Barnaby et al. | 73/505 |
| 2,974,530 | 3/1961 | Jaouen | 73/505 |
| 3,127,775 | 4/1964 | Hansen et al. | 73/505 |
| 3,504,554 | 4/1970 | Taylor | 73/505 |
| 3,789,673 | 2/1974 | Berlin et al. | 73/505 |
| 3,839,915 | 10/1974 | Schlitt | 73/505 |
| 4,019,391 | 4/1977 | Ljung | 73/505 |
| 4,264,838 | 4/1981 | Jacobson | 73/505 |
| 4,267,731 | 5/1981 | Jacobson | 73/505 |
| 4,524,619 | 6/1985 | Staudte | 73/505 |
| 4,538,461 | 9/1985 | Juptner et al. | 73/505 |
| 4,654,663 | 3/1987 | Alsenz et al. | 73/505 |
| 4,671,112 | 6/1987 | Kimura et al. | 73/505 |
| 4,674,331 | 6/1987 | Watson | 73/505 |
| 4,759,220 | 7/1988 | Burdess et al. | 73/505 |
| 4,802,364 | 2/1989 | Cage et al. | 73/505 |
| 4,836,023 | 6/1989 | Oikawa | 73/505 |
| 4,884,446 | 12/1989 | Ljung | 73/505 |
| 4,899,587 | 2/1990 | Staudte | 73/505 |

Primary Examiner—John E. Chapman
Attorney, Agent, or Firm—Dorr, Carson, Sloan & Peterson

[57] ABSTRACT

Apparatus for measuring an angular rate of turn employing vibrating elements which are so arranged that the reaction forces from both the driven deflection vibration mode as well as from the reaction deflections from the angular turn rate are contained within the assembly. The apparatus further employs means for selectively controlling the stiffness of the structure for undesirable modes of vibration while allowing maximum flexible coupling for the desirable modes of vibration thus minimizing the effects of outside vibrational influences and changing boundary conditions from causing errors in the turn rate signals. The assembly further employs unique non-contacting motion drivers and detectors for driving and sensing the movement of the elements without adversely affecting that motion. The apparatus further employs unique damping means which can dampen unwanted vibrational influence for selected modes and directions.

43 Claims, 10 Drawing Sheets

CONTROLLED VIBRATION ANGULAR RATE SENSOR

FIELD OF THE INVENTION

This invention relates to angular rate of turn detectors and, in particular, to angular rate of turn detectors using a plurality of vibrating elements mounted on a common base.

BACKGROUND OF THE INVENTION

In the art of vibrating element angular rate sensors it is well known that a vibrating mass subjected to an angular rate of turn experiences gyroscopic forces whose effects, such as deflections, forces or stresses, can be utilized as an indication of the magnitude of a turn rate.

Many embodiments utilizing this effect have been employed to various degrees of success. Examples of some of the different shapes employed include the traditional tuning fork shape of U.S. Pat. No. Re 22,409 to Lyman, the cantilever beam type of U.S. Pat. No. 4,267,731 to Jacobson, the vibrating wire shape of U.S. Pat. No. 3,903,747 to Johnson, the coaxial tuning fork of U.S. Pat. No. 4,802,364 to Cage, the free beam type of U.S. Pat. No. 4,836,023 to Oikawa, and the hollow cylinder type of U.S. Pat. No. 4,759,220 to Burdess. Each of these different shapes utilizes the same well known concept of a lightly damped mass/spring system designed to vibrate in a prescribed mode shape.

As is well-known in the art, when such a system is vibrated in a prescribed mode shape and is subjected to an angular rate of turn about certain axes, it experiences gyroscopic forces which can cause measurable system effects indicative of the rate of turn. These resonant systems are designed to enhance these measurable effects which are usually exemplified as forces causing deflections and/or stresses and which can be directly measured as an indication of the angular rate of turn.

A vibrating angular rate sensor provides superior performance and longer service life for less cost over the traditional spinning rotor-type rate sensors due to its inherent simplicity, reduction of the total number of parts, elimination of wearing and temperature sensitive parts, etc. Yet, to date, the standard spinning rotor type angular rate sensor is still the most used technology for this purpose.

One of the major problems associated with attaining accurate measurements from a vibrating element angular rate sensor has been the isolation of the vibrating element from influences of its environment such as ambient vibration and changes in the device mounting or boundary conditions. This problem is due, in part, to the fact that this type of apparatus is designed to be a highly resonant structure with a minimum of damping and can, therefore, vibrate in not only the desired "driven" mode of vibration but also a number of other modes of vibration. The influence of ambient vibration or changing mounting conditions can excite these other modes of vibration to cause disturbances on to the driven mode. If these disturbances are synchronous with the driven mode by being at or near its frequency or one of its harmonics, errors can occur in the resultant turn rate signals. If these disturbances are non-synchronous with the driven mode, then the result is usually noise in the resultant rate signals. Therefore, all natural modes of vibration that occur on the structure except for the driven mode represent potential sources of error or noise in the resultant rate signals.

Traditionally, the vibrating elements used on this type of device have been very simple shapes such as straight wires, cantilever beams, fixed beams, and others. Each of these shapes can vibrate in any of a number of well-defined natural modes of vibration. It is generally not possible to eliminate any one natural mode of vibration from such a simple structure. It is usually only possible to change some of its characteristics such as frequency, mode shape or damping. The best design strategy for this type of device is to place the natural frequencies of all other modes of vibration safely away from that of the driven mode and its harmonics.

It is, therefore, recognized that the ability to control the frequency of the naturally occurring modes of vibration and the separation of those modes from harmonics of the driven frequency would represent a great improvement in the art.

Single element vibrating angular rate sensors are particularly sensitive to ambient vibration and changing mounting conditions because reaction forces from the vibration of the element are applied directly to its attachment to the sensor's mounting structure. This allows vibrational energy to escape to the environment and ambient vibrational energy to enter and disturb the vibrating element. Multiple element vibrating angular rate sensors, such as tuning forks, were conceived as an attempt to circumvent the single element problem by vibrating one element in opposition to another element to isolate the vibrational energy and keep the reaction forces balanced and inside the vibrating system. This reduces the influence of the mounting conditions and ambient vibration from having an effect on the vibrating apparatus. Although the concept of using multiple vibrating elements has been implemented by many embodiments with good results, another problem was created which was the more than doubling of the natural modes of vibration into "in-phase" and "out-of-phase" modes and the necessity to control these additional modes.

For clarity, the term "out-of-phase mode" is defined as a deflected shape or mode shape in which the reaction forces from the deflection of a first element are opposed by substantially equal and opposite forces from another element of the apparatus with the result that substantially no net reaction forces are applied to the common mounting or boundary conditions of the apparatus. The term "in-phase mode" is defined as a deflected shape or mode shape in which the reaction forces from the deflection of a first element are added to substantially equal forces from another element of the apparatus with the result that the total reaction force is applied directly to the common mounting or boundary conditions of the apparatus.

U.S. Pat. No. 4,802,364 to Cage et al. entitled "Angular Rate Sensor" discloses an angular rate sensor where tynes vibrate in a coaxial manner. Both the driven mode of vibration and the reaction mode of vibration are balanced with the mass spring elements vibrating in opposition to each other for both directions.

Although the balancing of the vibration for both the driven and the reaction directions represents an important forward step, the problem of mode separation is left unaddressed. Further, in order for the tynes of this arrangement to be well coupled to each other, the common base needs to be flexible in relation to the tynes. In other words, the more rigid the common base, the less each tyne "feels" the effect of its opposing tyne and they can therefore lose track of each other's timing or phase relationship. In the extreme case the tynes could vibrate independently since they would have no effect on each other. On the other hand, if an excessively flexible common base is used, the necessary mounting pedestal which attaches the device to the rest of the world would interfere with this flexibility and therefore creates an undesirable design trade off between coupling and mounting parameters.

It is one object of the present invention, therefore, to provide a unique structure and measurement technique which is highly immune to the affects of ambient vibration and changing mounting conditions while maintaining a high degree of flexible coupling between the vibrating elements and at the same time allowing for a prescribed amount of separation between the driven mode of vibration and its harmonics from other undesired modes of vibration.

Another problem associated with vibrating element angular rate sensors is that of creating motion drivers and detectors that accurately drive and sense the vibrational movement without influencing or disturbing the resultant signals. Methods previously employed for this purpose include piezoelectric bending element sensors and drivers, capacitive plate sensors and inductively coupled drivers and sensors. Each of these methods can have adverse affects on the vibrational characteristics of the instrument by creating forces between the elements of the motion sensors or drivers through inductive or capacitive coupling. Also, the connection of wires or electrodes to the vibrating elements can add structural characteristics which can adversely affect the vibrating characteristics of the instrument and can cause errors in the resulting signals. These wires and electrodes are subjected to the vibration of the tynes and can also fatigue, causing total failure of the apparatus.

A second object of this invention is to provide a means whereby an angular rate sensor can be created with motion drivers and motion detectors that accurately drive and sense the vibrational movement of the elements without introducing structural characteristics or forces that adversely affect the vibration of the structure or the resultant signals therefrom. In addition, since these motion drivers and detectors are not subjected to the vibration of the elements, the arrangement eliminates the possibility of fatigue failure of these components.

A third problem associated with vibrating angular rate sensors is that of reducing the influence of unwanted resonances on the structure. Traditionally vibrating element angular rate sensors are designed to operate as lightly damped or highly resonant systems. Certain types of input motion can start undesired modes freely vibrating adding unwanted beat or noise frequencies to the resultant signals that fail to die out in an acceptable length of time.

It is a third object of this invention, therefore, to provide a means for creating a vibrating angular rate sensor which can quickly reduce unwanted vibrations without introducing errors on the resultant signals.

It is another object of the invention to provide a means for controlling changes in the distance between two objects, at least one of which is moveable, by controlling the strength of a magnetic field existing between the two objects.

SUMMARY OF THE INVENTION

According to the first object of the present invention, an angular rate sensor is herein provided which is highly immune to the affects of ambient vibration and changing device mounting conditions while maintaining a high degree of flexible coupling between a plurality of vibrating elements and at the same time allowing for a prescribed amount of frequency separation between the in-phase and the out-of-phase modes of vibration and further allowing for the separation of the driven mode of vibration and its harmonics from other undesired modes of vibration. This is accomplished by a combination of a unique geometry of elements.

The unique geometry of one possible preferred exemplary embodiment comprises four elastic elongated members (tynes) arranged in a pattern about a common axis, and mounted as vibrating beams from a common base. At selected distances above the common base, three unique coupling members are provided to allow for the control of frequency separation and tyne coupling.

First, a coupling plate which connects all four tynes together is located at a selected distance above the common base. Further up the tynes, two cross coupling bars connect oppositely positioned paired tynes together for synchronizing the motion of each pair for the driven and the reaction modes of vibration. The design and location of these coupling members control and optimize the desired mode of vibration and its harmonics and separates them from other modes while maintaining a high degree of coupling between the tynes.

According to the second object of the present invention, a vibrating element angular rate sensor is herein provided with motion drivers and motion detectors that accurately drive and sense the vibrational movement of the elements (tynes) without introducing structural characteristics or forces that can adversely affect the vibration of the structure or the resultant signals therefrom. The motion drivers and motion detectors of the exemplary preferred embodiment comprise pairs of mutually attracting permanent magnets which are fixedly attached to the tynes. The magnets are affixed to the tynes so that the magnetic fields between pairs of magnets vary proportionally with selected relative motion between the tynes. The magnets are arranged so the forces on the structure resulting from magnetic attraction cancel each other. Coils are attached only to the case and are positioned in the magnetic fields. The coils are used as motion drivers by forcing current through the coils and as motion detectors by sensing the voltage induced in the coils from their associated changing magnetic fields.

This unique arrangement eliminates all electrical connections and devices from the vibrating structure. This avoids the danger of errors caused by changes in the vibration due to these connections and devices. It further avoids the danger of complete failure from vibration caused fatigue on these components.

The motion drivers of the present invention are not limited for use with angular rate sensors. They may be used in any application to vary the distance between two objects by varying the strength of a magnetic field existing between the two objects each of which has a magnet affixed thereto. The strength of the magnetic field may be controlled by applying drive currents to a coil positioned within the magnetic field.

The motion detectors of the present invention are not limited for use with angular rate sensors. They may be used in any application to detect changes in the distance between two objects having magnets affixed thereto by detecting changes in the strength of the magnetic field existing between the two objects as the distance between the objects changes. This detection may be accomplished by positioning a coil in the magnetic field with the coil generating output signals as the strength of the magnetic field varies.

According to the third object of the invention, a vibrating element angular rate sensor is provided which reduces the effect of unwanted natural frequencies without introducing errors in the resultant signals. This is accomplished by a damping device associated with the tynes which absorbs energy from selected modes of vibration. In the preferred exemplary embodiment, this damping device comprises at least one conductive path associated with one or more of the magnetic fields whereby selected motion of the tynes induces currents and resistive losses in the conductive path. The losses thus produced absorb energy from unwanted modes of vibration reducing their amplitude to acceptable levels.

In addition to passive damping devices, arrangements employing electrically active damping elements have also been successfully tested or contemplated and are hereinafter described.

BRIEF DESCRIPTION OF THE DRAWINGS

The invention may be better understood from the following detailed description thereof taken in conjunction with the drawing in which.

DETAILED DESCRIPTION OF THE INVENTION

Figure 1:
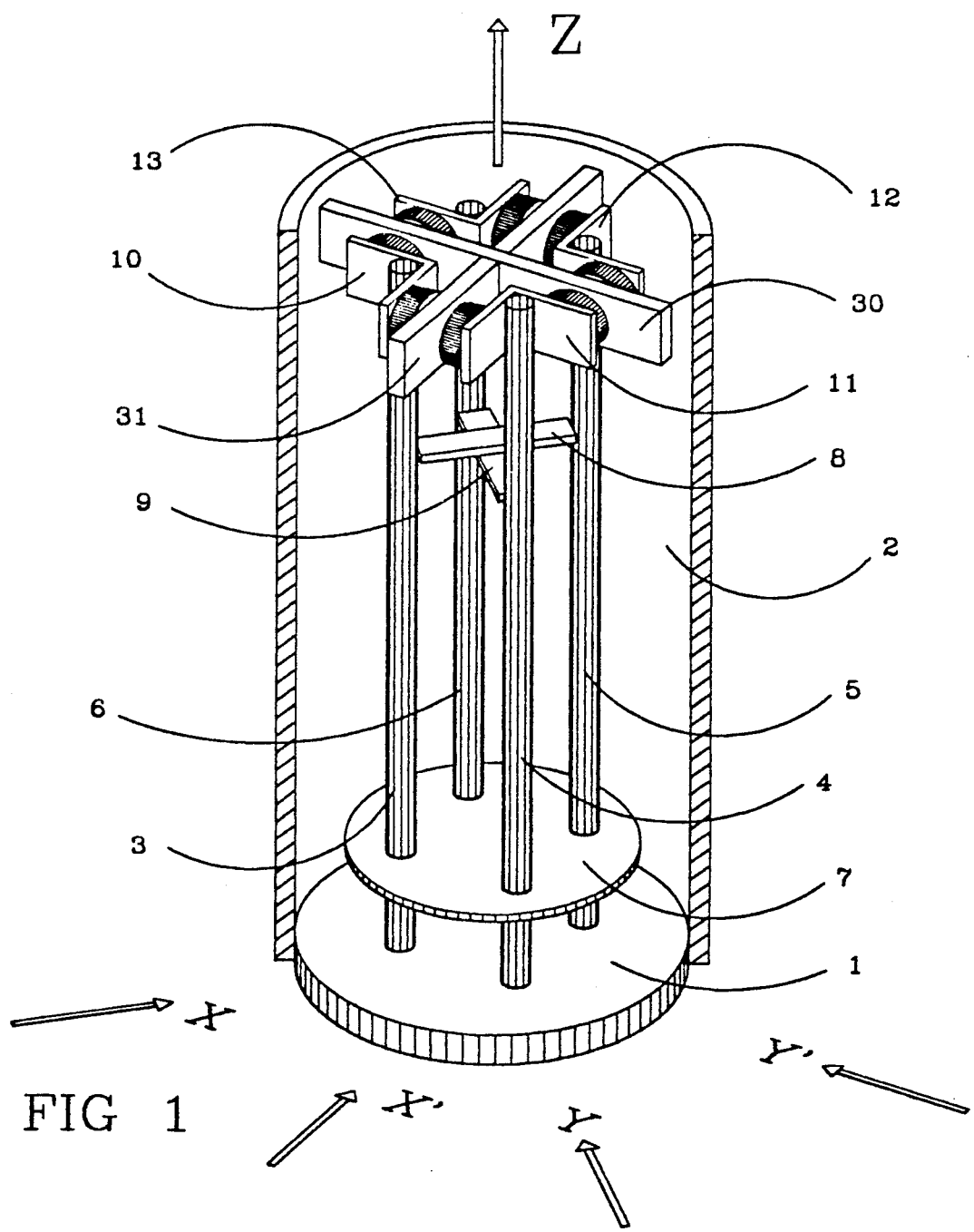
FIG. 1 is a perspective view of one possible preferred exemplary embodiment of the present invention with half the cylindrical case 2 cut away for viewing the apparatus inside.

Prior to describing the design and operation of one possible preferred exemplary embodiment, it is useful to review some of the modes of vibration which can occur on the structure and which represent potential sources of error or noise and thus who's frequencies and damping need the control afforded by the present invention.

Finite Element Analysis, hereinafter referred to as FEA, is a mathematical method of analyzing, among other things, the deflections and natural frequencies of structures. Using commercially available FEA software like COSMOS/M from Structural Research and Analysis Corporation, a designer can model and predict the mode shapes and natural frequencies of a vibrating element angular rate sensor. FIGS. 3, 4, 5, 6 and 7 are representations of the graphical results one can obtain from FEA software depicting five of the natural modes of vibration in which the preferred embodiment can vibrate, and where the amount of deflection shown is greatly exaggerated for clarity. In these figures, tynes 3, 4, 5 and 6 are represented by curved lines and the lumped masses 67, 68, 69 and 70 at the top of each tyne are representations of the sum of the masses of the magnets and bracket that are attached to the top of each tyne. For example, in FIGS. 3, 4, 5, 6 and 7 lumped mass 67 at the top of tyne 3 represents the total mass of bracket 10 and magnets 14 and 15 in FIG. 11.

Figure 3:
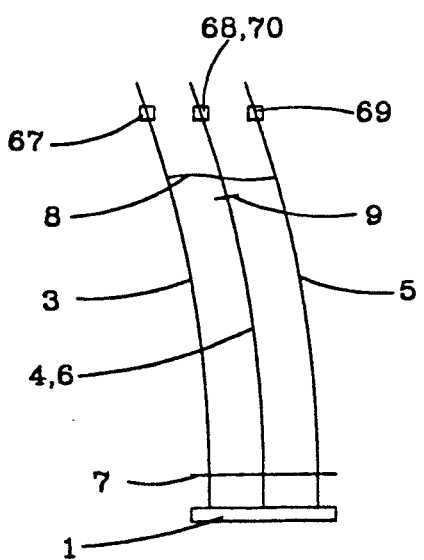
FIG. 3 is a finite element analysis model of the preferred embodiment viewed down the Y axis depicting the first in-phase bending mode of vibration in the X direction where all tynes are moving in unison in the X direction and tynes 4 and 6 being in line with one another from this view are represented by one line.

FIG. 3 represents the first in-phase mode in the X direction of FIG. 1 and is identified by all four tynes moving in unison "in-phase" back and forth along the X axis and is typically the lowest frequency mode shape. This mode is a potential source of noise or error depending on its separation from the driven mode and needs to be carefully controlled. In this view, tynes 4 and 6 are in line with each other so are shown as one line.

Figure 4:
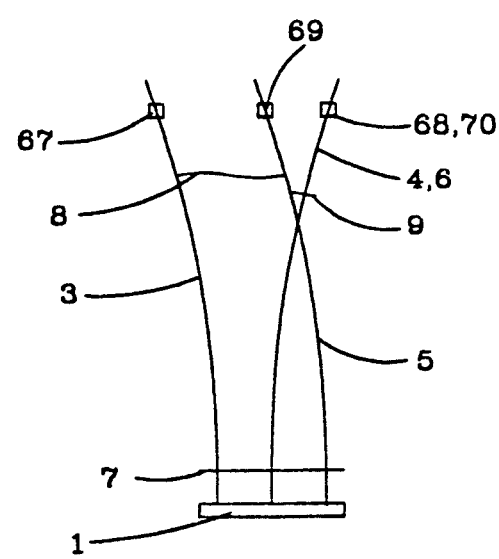
FIG. 4 is a finite element analysis model of the preferred embodiment viewed down the Y axis depicting the first out-of-phase bending mode of vibration in the X direction where two oppositely connected tynes move in one direction while the other two tynes move in the opposite direction and tynes 4 and 6 are in line with one another from this view and are represented by one line.

FIG. 4 represents the first out-of-phase mode in the X direction and is identified by tynes 3 and 5 together moving in opposition to or "out-of-phase with" tynes 4 and 6 along the X axis. This mode is typically the second occurring frequency on the structure and has been chosen as the driven mode for operation on the exemplary preferred embodiment although it is understood that any natural mode could be chosen for this function.

Figure 5:
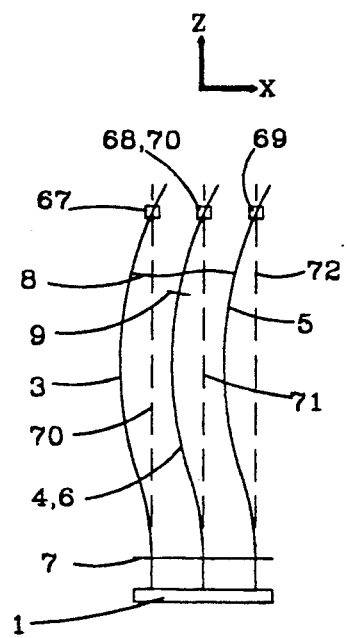
FIG. 5 is a finite element analysis model of the preferred embodiment viewed down the Y axis depicting the second in-phase bending mode of vibration in the X direction where all four tynes are moving in unison in the X direction but where the direction of the deflected shape doubles back on itself and tynes 4 and 6 are in line with one another from this view and are represented by one line.

FIG. 5 represents the second in-phase mode in the X direction and is identified by all four tynes moving in unison "in-phase" back and forth along the X axis but differs from that of FIG. 3 in that the deflection of the lower part of the tynes is in one direction while the upper part reverses in direction.

Figure 6:
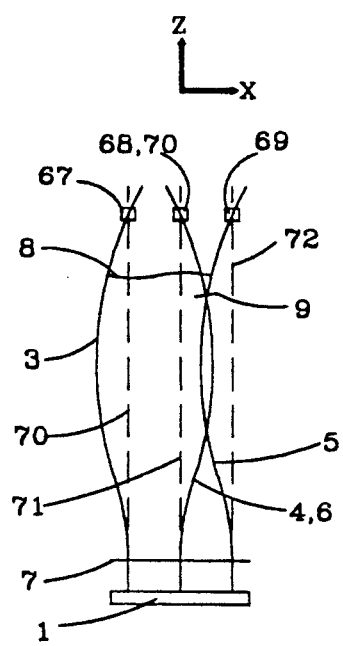
FIG. 6 is a finite element analysis model of the preferred embodiment viewed down the Y axis depicting the second out-of-phase bending mode of vibration in the X direction where tynes 3 and 5 are vibrating in opposition to tynes 4 and 6 and both pair have the same doubled back shape as in FIG. 5 and tynes 4 and 6 are in line with one another from this view and are represented by one line.

FIG. 6 represents the second out-of-phase mode in the X direction and is identified by tynes 3 and 5 together moving in opposition to tynes 4 and 6 back and forth along the X axis. It differs from that of FIG. 4 in that the deflection of the lower part of the tynes is in one direction while the upper part reverses in direction.

Figure 7:
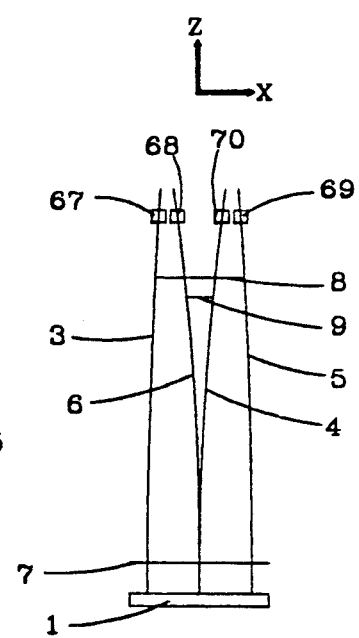
FIG. 7 is a finite element analysis model of the preferred embodiment viewed down the Y axis depicting the first in-phase twist mode of vibration with tynes 3 and 5 as well as tynes 4 and 6 twisting in the same direction about the Z axis.

This series of modes of vibration continues on up in frequency with the deflection of the tynes reversing directions one more time for each higher mode shape for both in-phase modes and out-of-phase modes. In addition to the X direction modes just described there are analogous mode shapes where the tynes are deflecting in the Y direction of FIG. 1. In addition to the X and Y direction modes just described where the tynes are essentially bending, there are a series of mode shapes in which the tynes twist about the Z axis as shown in FIG. 7 which is the first in-phase twist mode of vibration. In this mode, tynes 3 and 5 and tynes 4 and 6 all rotate or twist in unison "in-phase" about the Z axis. There is also a first out-of-phase twist mode about the Z axis (not shown) where tynes 3 and 5 rotate in one direction while tynes 4 and 6 rotate as a paired structure in the opposite direction about the Z axis. As in the case of the bending modes previously described, there are higher order twist modes where the twisting of the tynes reverses directions one or more times for each higher mode shape.

All these possible modes of vibration seem to form an endless list and, in theory, they can. But as a practical matter, the higher the frequency of a mode of vibration, the easier it is to both mechanically and electronically filter or dampen its effect to the extent that only modes that are in the range of 0 to 10 times the driven frequency need be of concern. Therefore, in general, only the modes shown in FIGS. 3 through 6 and their corresponding modes in the Y direction need be of concern.

FIG. 1 is a perspective view of one possible preferred exemplary embodiment of the present invention. The apparatus of FIG. 1 comprises a rigid common base 1 which may form or be affixed to the bottom end of a cylindrical housing 2. Tynes 3, 4, 5 and 6 are arranged in a symmetrical pattern about the Z axis of the apparatus and are affixed to base 1. Tynes 3, 4, 5 and 6 are preferably, but not necessarily, arranged to be parallel to each other and perpendicular to the common base 1. Tynes 3, 4, 5 and 6 are preferably made of a highly elastic, high fatigue strength material with a constant elastic modulus such as Ni-Span-C from International Nickel Co. or Low Expansion 43-PH from Carpenter Technology Corp. Other alloys that have been successfully tested or contemplated include 300 series stainless steel alloys, titanium alloys, aluminum alloys, quartz and piezoelectric ceramics. In the preferred embodiment, the means of attachment of tynes 3, 4, 5 and 6 to common base 1 is by vacuum furnace brazing. However, some of the other methods that have been successfully tested or contemplated include torch brazing, dip brazing, TIG welding, electron beam welding, press fitting, adhesive bonding, and soldering.

Figures 17, 18:
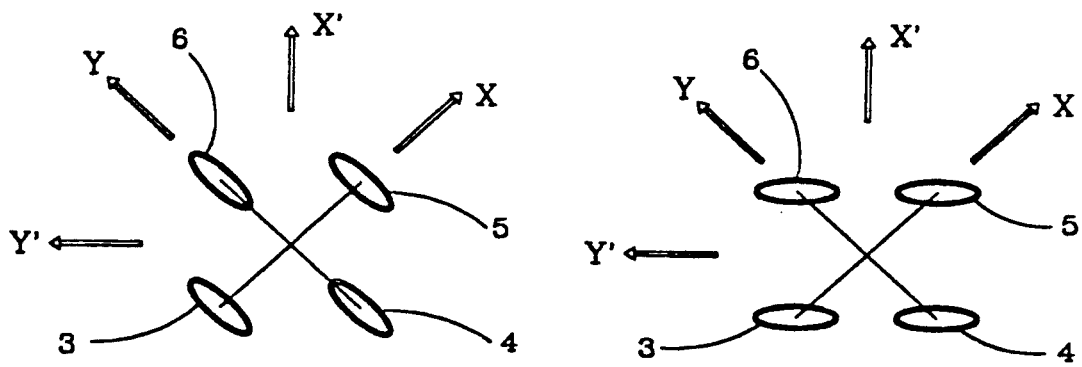
FIG. 17 is a cross-sectional view through the tynes of the preferred embodiment showing the alignment of the principal axes of the tynes.
FIG. 18 is a sectional view through the tynes of the preferred embodiment showing an alternate alignment of the principal axes of the tynes from that shown in FIG. 17.

Tynes 3, 4, 5 and 6 are preferably made from tubing that is formed to have a cross-sectional profile of either elliptical or rectangular shape between the coupling plate 7 and the cross coupling bars 8 and 9 to provide for different stiffness characteristics and, thus, different vibration frequencies for the X and Y directions. The alignment of the elliptically formed cross-sections of tynes 3, 4, 5, and 6 of the preferred exemplary embodiment is shown in FIG. 17. The amount of stiffness difference about the X-axis and the Y-axis is predicated on the frequency separation required between the driven mode of vibration in the X direction as shown in FIG. 4 and the first out-of-phase mode of vibration in the Y direction. In the preferred exemplary embodiment, the frequency of the driven mode in the X-direction is designed to be less than the natural frequency of the reaction mode in the Y-direction.

As is well-known in the art, gyroscopic forces resulting from the combination of angular turn rate about the Z axis and the driven vibration of the tynes in the X direction deflect the tynes in the Y direction at the frequency of the driven vibration. This causes the tynes to vibrate in an elliptical pattern around the Z axis. Since the tynes are designed to have a specific natural frequency of vibration in the Y direction, the resulting amplitude of the deflection in the Y direction can be greatly amplified in accordance with the tyne response curve of FIG. 2 where the ordinate represents amplitude amplification factor (gain) and the abscissa represents the ratio of the frequency of the driven mode of vibration in the X direction divided by the natural frequency of the reaction mode of vibration in the Y direction.

Figure 2:
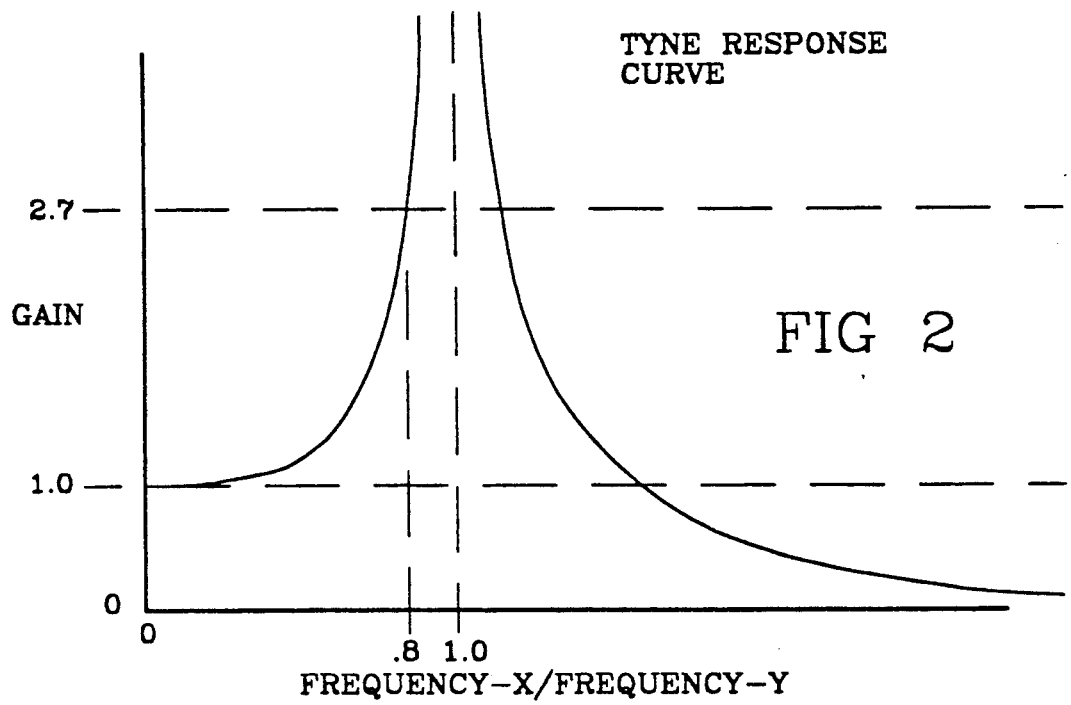
FIG. 2 is a graph of the response of the tynes due to gyroscopic forces as the ratio of the driven frequency to the natural reaction frequency varies.

The graph of FIG. 2 shows that if a gyroscopic force on the tynes in the Y direction is, for example, one ounce and in a static condition that force would bend the tynes 0.1 inches, then by designing the natural frequency of the driven mode to be close to the natural frequency of the reaction mode by a ratio of 0.8, as shown on the graph, then instead of the tynes bending 0.1 inches, they would actually bend 2.7 times that or 0.27 inches just due to the ratio of the natural frequencies. This phenomenon is well known and is referred to as dynamic response or frequency response.

As can be discerned from the graph of FIG. 2, large gain factors can be achieved by designing these two frequencies to be close together. However, as this ratio approaches one, instabilities result and changes in structural damping becomes critical. As a practical matter therefore gain factors between 1 and 10 are generally acceptable on either side of the peak.

At a selected distance above common base 1 on FIG. 1, coupling plate 7 is fixedly attached to tynes 3, 4, 5 and 6 preferably by vacuum furnace brazing. The design of coupling plate 7 and its height above common base 1 is predicated upon the amount of frequency separation desired between the driven mode and the first in-phase mode of vibration in the X direction (FIG's 4 and 3). This allows the designer the unique ability to separate these frequencies by the required amount for a given design to avoid noise or errors in the resultant rate signals as previously described.

Most aerospace, military and civilian applications can involve high ambient G-levels, random vibration and changing boundary conditions. To be useful in these environments, the entire apparatus should be as stiff as possible. Therefore, the first in-phase bending mode in the driven direction should be as stiff or as high in frequency as possible without interfering with the first out-of-phase mode in the driven direction. Since, in general, the first in-phase mode is below the first out-of-phase mode for most boundary conditions, a good practical design would be setting the in-phase mode 5 to 25 percent below the out-of-phase mode.

As a practical example, the preferred exemplary embodiment has a coupling plate 7 with a thickness comparable to the wall thickness of tynes 3, 4, 5 and 6. By mounting coupling plate 7 at a distance approximately equal to five tyne diameters or about 10 to 15 percent of the tyne length above common base 1, the separation between the first inphase and the first out-of-phase modes will be approximately 15% for both the X and Y directions.

At a prescribed distance above coupling plate 7 on FIG. 1, there are two cross coupling bars 8 and 9. Cross coupling bar 8 connects tyne 3 to tyne 5 and cross coupling bar 9 connects tyne 4 to tyne 6 to synchronize the motion of their connected tynes for both the driven (X) and the reaction (Y) modes of vibration. In the preferred exemplary embodiment of FIG. 1, cross coupling bars 8 and 9 are made of the same material as tynes 3, 4, 5 and 6, are formed as thin plates and are fixedly attached to their respective tynes by vacuum furnace brazing.

Figure 8:
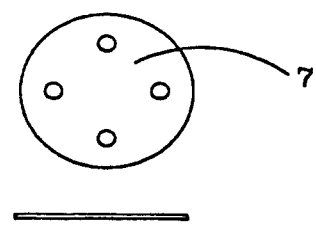
FIG. 8 is a top and front view of the coupling plate used in the preferred embodiment.
Figure 9:
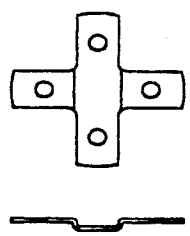
FIG. 9 is an alternate embodiment for the coupling plate used in the preferred embodiment with different bending and stiffness characteristics.
Figure 10:
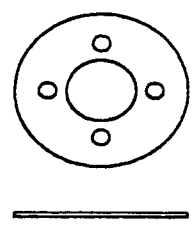
FIG. 10 is an alternate embodiment for the coupling plate used in the preferred embodiment with different bending and stiffness characteristics.
Figure 21:
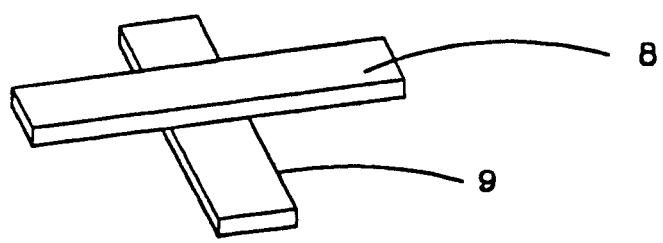
FIG. 21 is a close-up view of the cross coupling bars used in the preferred embodiment.

During the driven vibration of tynes 3 and 5 in the X direction, cross coupling bar 8 has to bend in the Z axis direction about the Y axis into a slight s-shape in order to track and synchronize the motion of tyne 3 and tyne 5 as shown in FIG. 4. Cross coupling bar 9 does not then bend. Therefore, cross coupling bar 8 adds a slight amount of stiffness to tynes 3 and 5 for the driven mode of vibration not present in tynes 4 and 6. This can cause a slight imbalance of the system. Similarly during the reaction vibration in the Y direction, cross coupling bar 9 bends (not shown) slightly about the X axis in order to track and synchronize the motion of tynes 4 and 6 while cross coupling bar 8 does not then bend. Therefore, cross coupling bar 9 adds a slight amount of stiffness to tynes 4 and 6 for the reaction mode of vibration not present in tynes 3 and 5. This can cause a slight imbalance of the system. This imbalance can be rendered negligible by designing cross coupling bars 8 and 9 to be weak in bending by making them thin in the Z direction as shown in FIG. 1 and 21. This imbalance can also be negated by adjusting the stiffness of the tynes or the coupling plate to compensate for this added stiffness. For example, the coupling plate of FIG. 9 or 10 could be used instead of that of FIG. 8. Or the cross sectional shape of tynes 3 and 5 could be designed to be different than that of tynes 4 and 6, or a combination of these choices. On FIGS. 5 and 6 it can be seen that cross coupling bar 8 flexes due to these higher mode shapes. Similarly, for the analogous mode shapes in the Y direction (not shown), cross coupling bar 9 flexes as well. Therefore, both cross coupling bars 8 and 9 are involved in determining the natural frequency of these modes. The twist mode of FIG. 7 also involves cross coupling bars 8 and 9 by causing them to flex about the Z axis in order to track the twisting motion of the tynes.

Due to the involvement of cross coupling bars 8 and 9 in these mode shapes, a designer, by varying shape, stiffness characteristics and location of cross coupling bars 8 and 9, has the ability to selectively add prescribed amounts of stiffness and thereby change the natural frequencies of selected modes of vibration to allow for the separation of those undesired modes from the driven mode or any of its harmonics.

Figure 22:
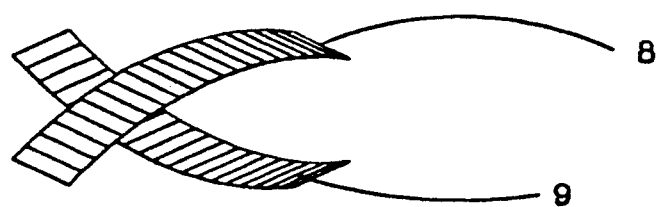
FIG. 22 is a close-up view of an alternate embodiment the cross coupling bars used in FIG. 1.
Figure 23:
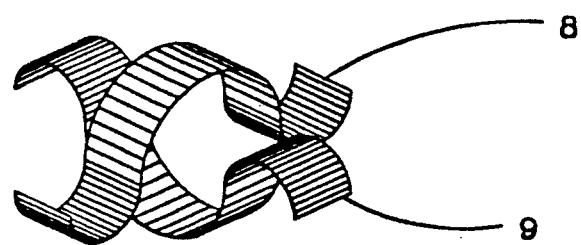
FIG. 23 is a close-up view of a second alternate embodiment of the cross coupling bars used in FIG. 1.

FIGS. 22 and 23 are alternate exemplary embodiments of cross coupling bars for enhancing selected design parameters.

On FIGS. 5 and 6 it can be seen that lumped masses 67, 68, 69 and 70 are essentially not displaced from their undeflected positions along lines 70, 71 and 72 and are therefor located at nodes of the vibration. By proper design and location of the sensors of the apparatus, this unique and useful arrangement is created whereby the motion detectors are essentially insensitive to the vibration of this mode thereby causing essentially no errors in the resultant rate signals should either of these modes be excited.

Figure 11:
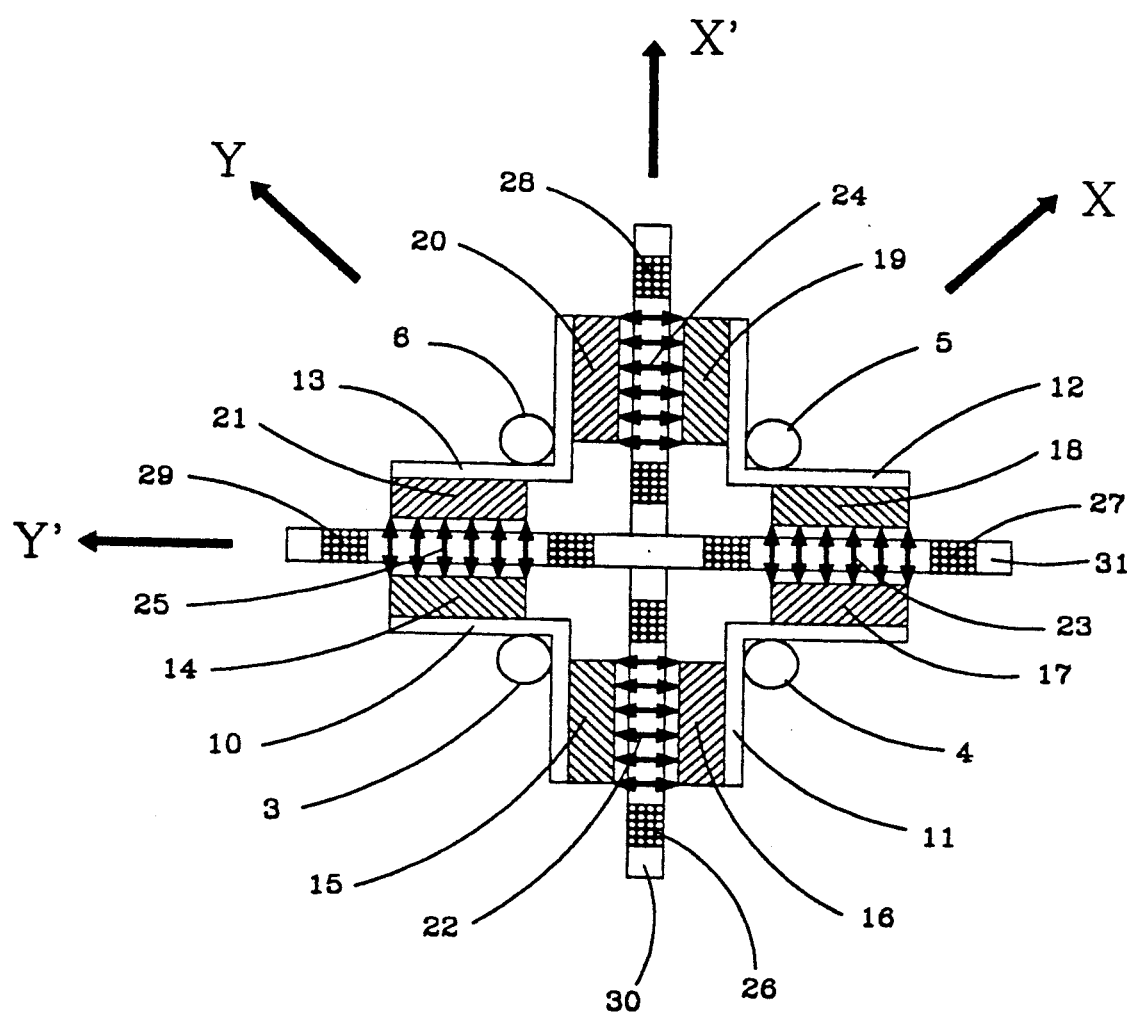
FIG. 11 is a section view parallel to the X-Y plane through the magnet coil arrangement used at the top of FIG. 1.

On FIGS. 1 and 11, near the end of tyne 3, 4, 5 and 6 are brackets 10, 11, 12 and 13 which are fixedly attached to their respective tynes. Preferably these brackets are made of a rigid nonmagnetic material such as 316 stainless steel and are attached to their respective tynes by vacuum furnace brazing. Bracket 10 is fixedly attached to magnets 14 and 15. Bracket 11 is fixedly attached to magnets 16 and 17. Bracket 12 is fixedly attached to magnets 18 and 19. Bracket 13 is fixedly attached to magnets 20 and 21.

Magnet 15 is positioned in attraction with magnet 16 to form magnetic field 22. Magnet 17 is positioned in attraction with magnet 18 to form magnetic field 23. Magnet 19 is positioned in attraction with magnet 20 to form magnetic field 24 and magnet 21 is positioned in attraction with magnet 14 to form magnetic field 25.

All eight magnets of the preferred embodiment are made of a rare earth alloy of samarium cobalt and are fixedly attached to their respective brackets by adhesive bonding. Other magnetic materials that have been successfully tested or contemplated include rare earth alloys of neodymium iron, alnico, ferrite and ceramic magnets. Alternate methods of attachment include mechanical attachment, press fitting, soldering, bolting and brazing.

On FIG. 11, coil 26 is positioned in association with magnetic field 22 and fixedly attached to PC board 30. Coil 27 is positioned in association with magnetic field 23 and fixedly attached to PC board 31. Coil 28 is positioned in association with magnetic field 24 and fixedly attached to PC board 30 and coil 29 is positioned in association with magnetic field 25 and fixedly attached to PC board 31. PC boards 30 and 31 are preferably fixedly attached to the case 2 (FIG. 1) to allow the apparatus to freely vibrate in either the X or the Y direction without mechanical attachment of any electronic components or connections for wiring, driving or sensing purposes.

Figure 12:
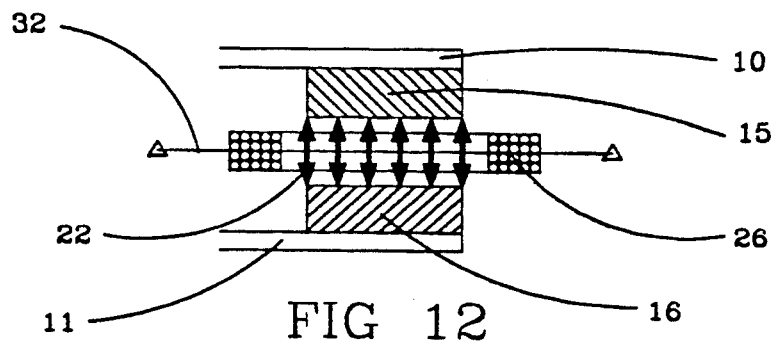
FIG. 12 is a close-up view of one of the magnet coil arrangements of FIG. 1.
Figure 13:
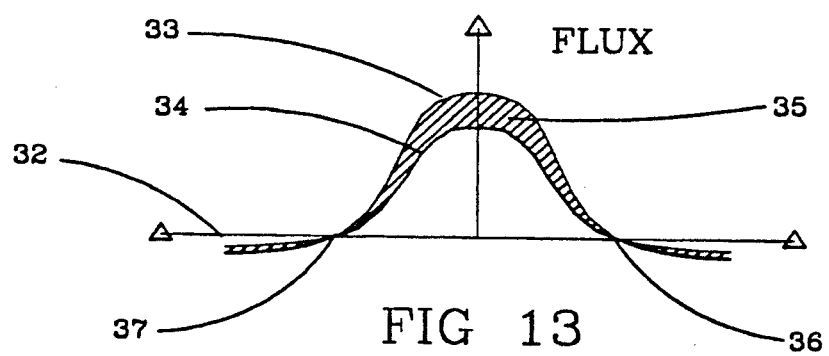
FIG. 13 is a graph of the magnetic field profile of the magnet coil arrangement of FIG. 12.

On FIGS. 12 and 13, a closer view of magnets 15 and 16 along with their associated magnetic field profile are depicted to more fully explain the operation of this arrangement as a motion detector. Magnet 15 and magnet 16 are positioned in attractive association with each other to create magnetic field 22 whose magnitude through line 32 of FIG. 12 is represented by line 33 of FIG. 13. As magnet 15 and magnet 16 move further apart from each other, the field magnitude through path 32 of FIG. 12 will be reduced from that of line 33 to that represented by line 34 of FIG. 13. The area 35 between line 33 and line 34 represents the net change in the magnetic field 22 and, according to Maxwell's equations, an electric field will be thus produced around magnetic field 22 proportionally related to the time rate of change of magnetic field 22. Thus, a voltage is produced in coil 26 proportionally related to the time rate of change in position of magnet 15 relative to magnet 16.

In the preferred embodiment, coil 26 is positioned in magnetic field 22 approximately where the field reaches a zero value as shown by points 36 and 37 of FIG. 13. Using this arrangement, small motions of magnets 15 and 16 moving in unison relative to coil 26, as from an in-phase mode of vibration, will cause essentially no change in the magnetic field within the area of coil 26 and thus will essentially cause no signals to be created in coil 26. Using this arrangement, errors and noise from in-phase modes of vibration are greatly reduced. As an alternative to using a sensing coil for detecting changes in the magnetic field, field sensing devices such as Hall effect or magneto resistive elements could also be used in place of the sensing coil 26 just described. A similar arrangement is also used as a motion driver whose operation is hereinafter described.

Referring now to FIG. 11, by forcing current through coil 27, a magnetic field is created coincident with magnetic field 23 and, depending on the direction of the current, either adds to or subtracts from the magnitude of magnetic field 23. A force is thus created between magnet 17 and magnet 18. This force is either attractive or repulsive depending on the direction of the current in coil 27. Due to the symmetrical arrangement of magnets and the central location of coil 27, essentially no force is thus created onto coil 27.

Figures 14, 15:
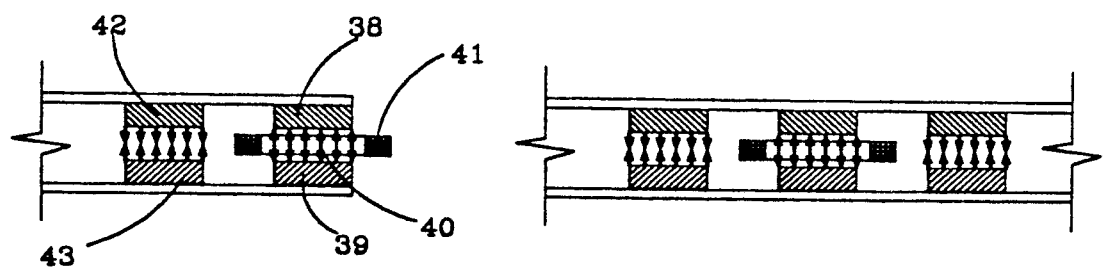
FIG. 14 is an alternate embodiment of the magnet coil arrangement of FIG. 12.
FIG. 15 is an alternate embodiment of the magnet coil arrangement of FIG. 12.

Referring again to FIG. 11, since each magnet is in attractive association with another magnet, and since there are two magnets on each tyne oriented approximately 90 degrees from each other, there is a small resultant force on each tyne pulling toward the center of the apparatus. Since this force is directly counteracted by the respective cross coupling bars 8 and 9, there is essentially no effect on the operation of the apparatus from this force. For other designs, however, if it is desired to eliminate this resultant force, an arrangement of magnets as shown in FIGS. 14 or 15 could be used as an alternative to the arrangement of FIG. 12. Such an arrangement of magnets that creates no resultant forces is next described.

Referring now to FIG. 14, magnets 38 and 39 are positioned in attraction with each other and thereby form magnetic field 40 which is surrounded by coil 41. In addition, magnets 42 and 43 are also positioned in repulsive association with each other and being of similar size and strength and being mounted on the same brackets as magnet 38 and magnet 39. This creates a condition whereby the attractive force from magnets 38 and 39 is counteracted by the repulsive force from magnets 42 and 43 and therefore no resultant force acts on the brackets. A more symmetrical arrangement is shown in FIG. 15 which includes two pair of repulsive magnets symmetrically arranged about a center attractive pair. Many more arrangements of attractive and repulsive magnets have been successfully tested or contemplated including concentric annular ring magnets or single piece magnets that are uniquely magnetized in such a way as to functionally replace multiple individually oriented magnets.

The unique advantages of the motion drivers and detectors just described are not limited to vibrating element angular rate sensors, but can be used on any device where it is desired to cause forces between, or to detect the relative motion between two objects, without any physical attachment of the electrical portion of the driver or detector to either object. There are many classes of devices that utilize forced motion or motion detection where this arrangement could be used. Examples are vibrating tube flow meters and densitometers, reciprocating pumps, actuators, voice coil motors, loud speakers, disk drives, shake tables, and others.

Ambient vibration can transfer energy into the angular rate sensor through the common base 1 to which tynes 3, 4, 5 and 6 are attached. This energy affects tynes 3, 4, 5 and 6 equally by exciting only in-phase modes of vibration. These in-phase modes cause no significant errors or noise in the resultant rate signals due to their frequency separation from the driven mode and due to the detectors insensitivity to in-phase motion. Extremely sudden rotations or impacts to the structure can excite out-of-phase modes of vibrations which can cause noise in the resultant rate signals. Since the structure is designed to be well balanced, these unwanted out-of-phase modes can resonate for unacceptable lengths of time. Adding damping to the structure can affect its sensitivity to turn rate and temperature variations. A method for a incorporating damping to the structure without affecting these sensitivities is hereinafter disclosed.

Figure 16:
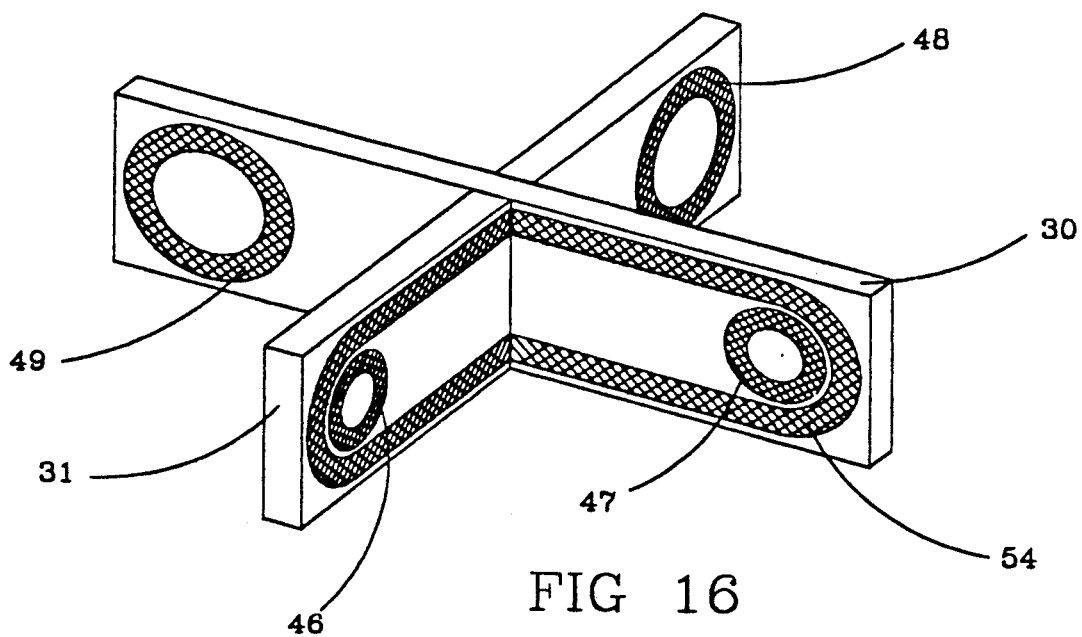
FIG. 16 is a perspective view of the PC board and damper arrangement used in the preferred embodiment.

On FIG. 16, PC board 30 and 31 assemble together at their centers to allow for electrical interconnections between them. Fixedly attached to PC board 30 and 31 are conductive paths 46, 47, 48 and 49 which are positioned in association with magnetic fields 23, 24, 25 and 22 of FIG. 11 and are so designed to provide eddy current damping for selected relative motion between tyne 3, 4, 5 and 6 for either the X or the Y directions. Conductive paths 46, 47, 48 and 49 are preferably made of material which has a constant thermal coefficient of resistance such as Evanohm Alloy S or CB Cupron Alloy both from the Carpenter Technology Corporation. As an alternate arrangement, path 54 of FIG. 16 provides damping for only certain prescribed motions or directions because it links both magnetic fields 23 and 24. Referring to FIG. 11, The forced vibration in the X direction causes magnetic fields 23 and 24 to increase and decrease in-phase with each other. Since conductive path 54 links both fields 23 and 24, an eddy current is established in path 54 causing damping for X direction motion. For the reaction vibration in the Y direction, fields 23 and 24 increase and decrease out-of-phase with each other since one is increasing while the other is decreasing. Coupling bar 9 connects tynes 4 and 6 to force them to move together in the Y direction. Therefore, fields 23 and 24 try to create currents in opposite directions around path 54, thus no eddy current damping is created for Y direction motion. Many arrangements of conductive paths can thus be devised for creating damping effects for prescribed directions or selected modes of vibration or both.

Other types of conductive paths that have been successfully tested or contemplated include copper traces etched upon the surface of PC board 30 and 31, turns of wire included on coils 26, 27, 28 and 29, conductive material used for the bobbins of coils 26, 27, 28 and 29, and others.

In addition to the passive damping methods just described, active methods can also be implemented on the geometry of the preferred embodiment as hereinafter described.

Referring now to FIG. 11, the force needed to drive the normal vibration of the tynes is created by forcing current through coils 27 and 28, for example Since these coils 27 and 28 are positioned 90° from each other, the resultant force on the tynes will be in the X direction if the two individual forces are substantially equal. If the two forces are not equal, the resultant force can have a component in the Y direction as well. This effect can be utilized both to damp unwanted vibration in the Y direction and to measure turn rate. The Y direction out-of-phase vibration of the tynes 4 and 6 with respect to tynes 3 and 5 causes signals in detector coils 26 and 29. From these vibration signals, a correction signal can be created that alternately forces more current through one drive coil than the other. This will create a force that stops or "null restores" the Y direction vibration. During angular turn rate this null restoration signal will be proportionally related to the rate of turn. If the Y direction vibration is caused by sudden rotation or impact, the null restoration signal will quickly stop the unwanted vibration.

The operation of the angular rate sensor according to the preferred embodiment of the present invention is next described.

On FIG. 11, coil 27 and coil 28 are electrically excited as drive coils at the natural frequency of the first out-of-phase mode of vibration to produce the requisite tyne motion in the X direction. This excitation causes alternately attractive and repulsive forces between magnets 19 and 20, and magnets 17 and 18. The result of these forces is that tyne 5 along with tyne 3, since they are connected by their associated cross coupling bar 8 on FIG. 1, move in unison back and forth along the X axis. At the same time tynes 4 and 6 move in unison, since they are also connected by their associated cross coupling bar 9 on FIG. 1, back and forth along the X axis in opposition to tynes 3 and 5. If there is no rotation of the device around the Z axis, which is perpendicular to the page of FIG. 11, then the simple X direction vibration of tynes 3 and 5 in opposition to tynes 4 and 6 is essentially the only vibration present. Due to this vibration, magnets 14 and 21 as well as magnets 15 and 16 get closer and further apart from each other in unison as they track this motion. This causes magnetic fields 22 and 25 to increase and decrease in-phase with one another and generates output signals in coils 26 and 29 that are in-phase with one another signifying essentially no rotation about the Z axis.

If the device is rotated about the Z axis while the X direction vibration is being maintained, gyroscopic forces will add a small Y direction component to the tyne motion. This pushes the tynes slightly back and forth in the Y direction with the result that an elliptical pattern of motion going around the Z axis is established for each tyne. For example, depending upon the direction of rotation of the device around the Z axis, tynes 3 and 5 will move in unison in a clockwise elliptical pattern around the Z axis while tynes 4 and 6 will move in unison in a counter-clockwise elliptical pattern around the Z axis. This small Y direction component from gyroscopic forces pushes tynes 3 and 5 in unison in the Y direction in opposition to tynes 4 and 6. If examined by itself, this Y direction motion would cause magnets 21 and 14 to approach each other while magnets 15 and 16 were moving apart. Thus, magnetic fields 25 and 22 would increase and decrease out-of-phase with each other since while one was increasing the other would be decreasing. Signals are thus generated in coils 29 and 26 that are directly out-of-phase with each other. Since this Y direction component does not occur by itself, but in conjunction with the X direction motion, the result is that output signals from coils 29 and 26 are directly in-phase with each other with no rotation about the Z axis and become phase or time shifted away from each other as rotation about the Z axis increases. The amount of phase or time shift between the signals from coils 29 and 26 is proportionally related to the amount of turn rate about the Z axis.

These signals can then be applied to a phase detection circuit or device (not shown) for the determination of the phase angle between these signals. The tangent of the phase angle thus determined is directly proportional to the angular rate of turn of the apparatus as described in Cage et al. For most designs this tangent function is small and essentially equals the phase angle itself, thus the phase angle or time difference can be used without compensating for the tangent function. The resultant signals can then be used in a variety of inertial guidance, position detection and control systems. The angular rate sensor thus produced has greatly enhanced stability in environments involving ambient vibration or changing boundary conditions due to the unique advantages of rejection of certain in-phase motion of the tynes, selective ability to control the undesired modes of vibration and to separate their frequencies from the driven mode of vibration and its harmonics and the ability to selectively dampen undesired tyne motion while driving and sensing the motion of the tynes with components that have no physical attachment to those tynes.

It is understood that the unique advantages of the current invention do not depend on the use of magnets and coils for the motion sensors and motion drivers as in the exemplary preferred embodiment. For example if the tyne material is selected to be piezoelectric ceramic or quartz, the motion sensors and drivers would then preferably be electrode surfaces on the tynes to take advantage of the piezoelectric effect. Other types of motion detectors that can be employed include capacitive displacement sensors, optical displacement sensors, fiber optic microbend sensors, and others.

In the preferred embodiment, phase or time related output signals are created that are proportionally related to turn rate. The unique advantages of the present invention can be used in an alternative embodiment in which output signals are created that are proportionally related to the amplitude of the deflection in the Y direction which, under certain conditions, are proportionally related to angular turn rate as next described.

On the preferred exemplary embodiment of FIG. 1, tynes 3, 4, 5 and 6 are formed to have an elliptical cross-section in the area between the coupling plate 7 and the cross coupling bars 8 and 9. The alignment of the principle axes of the elliptically formed sections of tyne 3, 4, 5 and 6 in the preferred exemplary embodiment are essentially in line with the X and Y axes as shown in FIG. 17. By simply changing the alignment of the principle axes of tyne 3, 4, 5 and 6 approximately 45 degrees to form the alignment shown in FIG. 18, an apparatus is thus produced that normally vibrates along the X' axis and reacts to gyroscopic forces by also vibrating along the Y' axis. Under certain conditions, this Y' direction vibration is proportionally related to the rate of turn. The operation of this alternate embodiment is next described.

On FIG. 11, and assuming the principle axes of tyne 3, 4, 5 and 6 are now aligned along the X' and Y' directions as shown in FIG. 18, coils 29 and 27 are electrically excited directly out of phase with each other at the natural frequency of the first out-of-phase mode of vibration to produce a motion of all tynes in the X' direction. This will cause tynes 4 and 6 to vibrate in unison back and forth along the X' axis in direct opposition to tynes 3 and 5. Gyroscopic forces resulting from an angular turn rate about the Z axis will then cause deflections of all tynes along the Y' axis. Since coils 26 and 28 are oriented in the Y' direction, the signals then produced in coils 26 and 28 will be proportionally related to the amplitude of the gyroscopic deflections. If the amplitude of the driven vibration in the X' direction is known, or held to be constant, the amplitude of the signals produced in coils 26 and 28 can be proportionally related to the angular turn rate.

Figure 19:
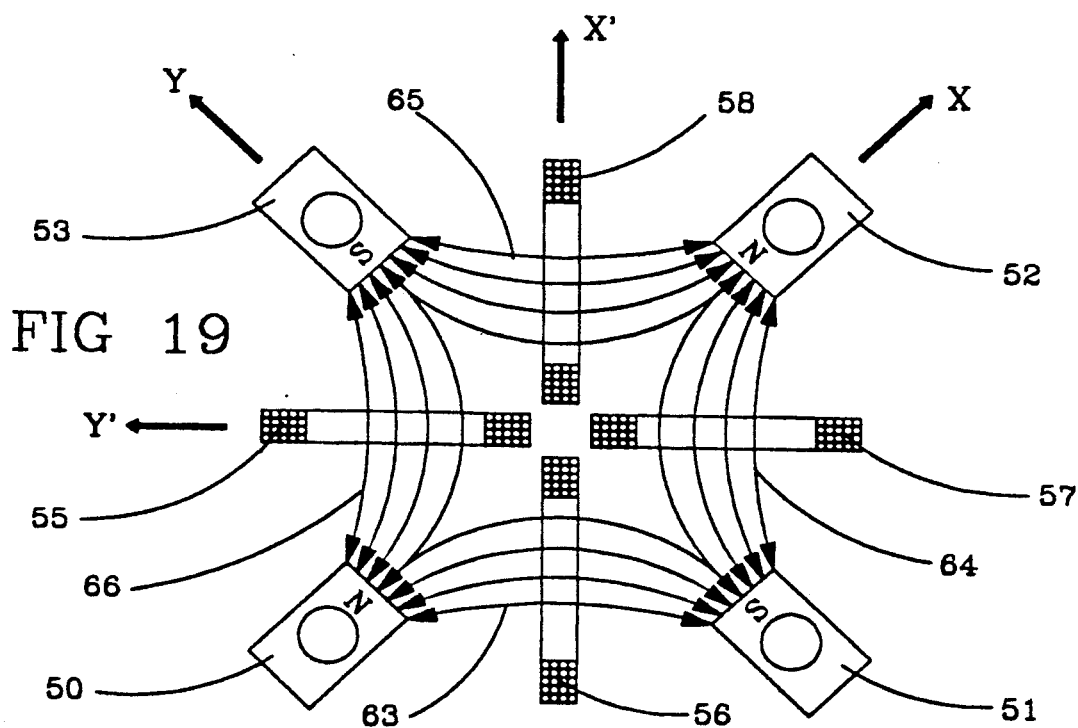
FIG. 19 is an alternate embodiment of the magnet coil arrangement shown in FIG. 11.

FIG. 19 discloses yet another alternate embodiment of the magnet and coil arrangement of FIG. 11 which uses only four magnets instead of eight. In this arrangement, magnet 50 of FIG. 19 replaces both magnets 14 and 15 of FIG. 11. Magnet 51 replaces magnets 16 and 17. Magnet 52 replaces magnets 18 and 19. And magnet 53 replaces magnets 20 and 21. Magnets 50, 51, 52 and 53 are so arranged to create magnetic fields 63, 64, 65 and 66 as shown in FIG. 19. In this arrangement, the elliptical cross sections of tynes 3, 4, 5 and 6 are aligned as shown in FIG. 17. Coils 55 and 56 are electrically excited with signals that are in-phase with each other as driver coils to create the requisite motion of all tynes in the X direction. During the combination of tyne vibration and an angular turn rate, output signals will be created in coils 57 and 58 whose phase or time relationship is proportionally related to the rate of turn in the same manner as the embodiment of FIG. 11. This embodiment is analogous to the preferred exemplary embodiment but uses only four magnets instead of eight.

Figure 20:
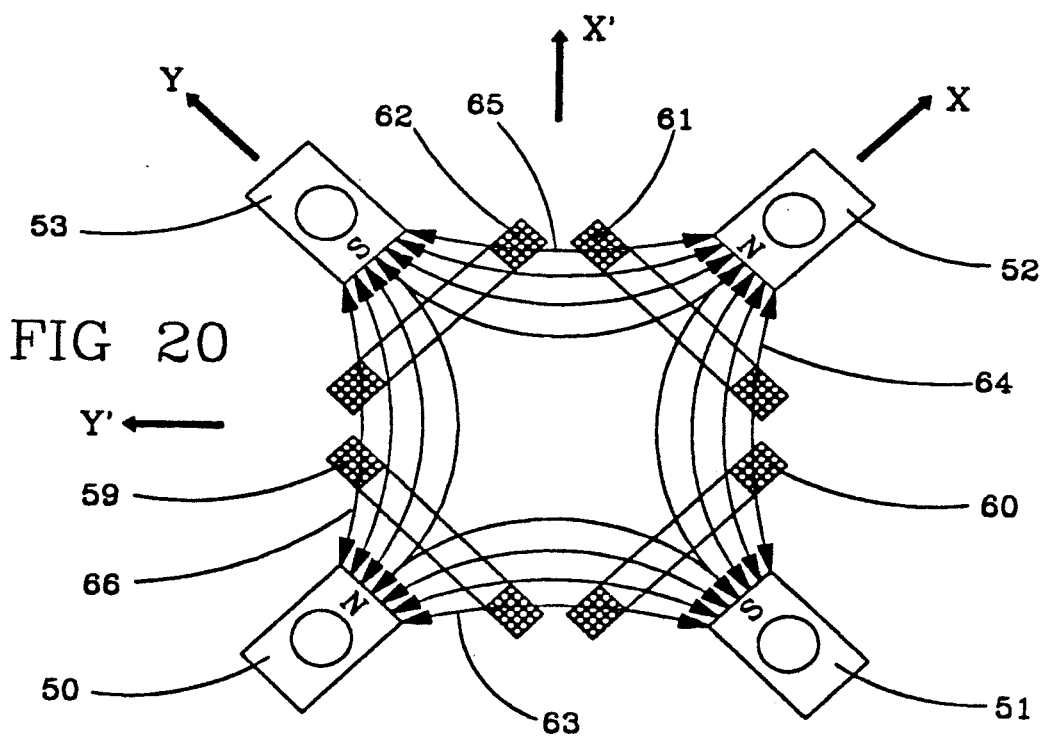
FIG. 20 is an alternate embodiment of the coil arrangement shown in FIG. 19.

By arranging the coils of FIG. 19 to that shown in FIG. 20, an embodiment is created which produces output signals proportional to the amplitude of the gyroscopic deflection in the Y direction which, under conditions of controlled or known driven amplitude in the X direction, can be used an indication of turn rate. In this arrangement, coil 59 is electrically excited to cause the requisite forced vibration in the X direction. Coil 61 is only sensitive to tyne motion in the X direction and is thus used to measure and or control the X direction motion. Gyroscopic tyne deflection in the Y direction produces in-phase output signals in coils 60 and 62 which are proportionally related to the amplitude of the vibration in the Y direction. Using the signals produced in coils 60 or 62 in conjunction with the signal produced in coil 61 the magnitude of angular turn rate can thus be determined.

Figure 24:
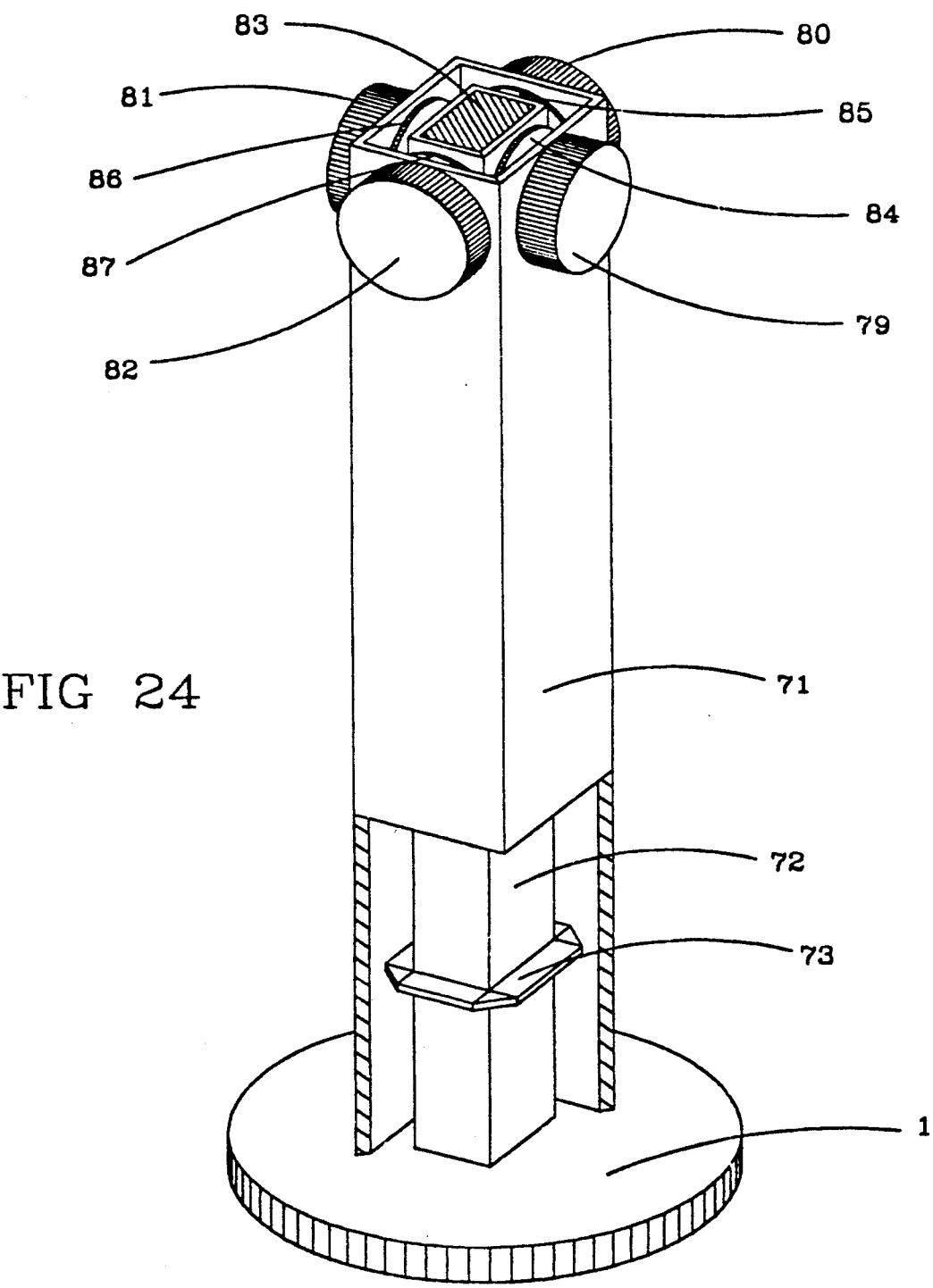
FIG. 24 is an alternative embodiment using two concentric tynes with, the lower portion of the outer tyne 71 cut away to show the coupling plate 73.

For manufacturing and design considerations, the preferred exemplary embodiment utilizes four tynes. However, the advantages of the present invention can be incorporated into any design involving two or more tynes that are mounted from a common base. For example, FIG. 24 is an exemplary embodiment using two concentric tynes 71 and 72. In this configuration, coupling plate 73 connects tyne 71 to tyne 72 to separate the frequency of the first in-phase mode from that of the first out-of-phase mode of vibration. In this two tyne configuration, no cross coupling bars are needed since it is not necessary to synchronize the motion of multiple tynes together. Magnets 82 and 80 interact with magnet 83 to form two magnetic fields (not shown) which pass through coils 87 and 85 to form the motion drivers for the driven direction. Magnets 79 and 81 interact with magnet 83 to form two other magnetic fields (not shown) which pass through coils 86 and 84 to form the motion detectors for the reaction direction. Using this arrangement the signals produced in coils 84 and 86 from gyroscopic forces would be proportionally related to the rate of turn if the driven amplitude is known or held to be constant.

Figure 25:
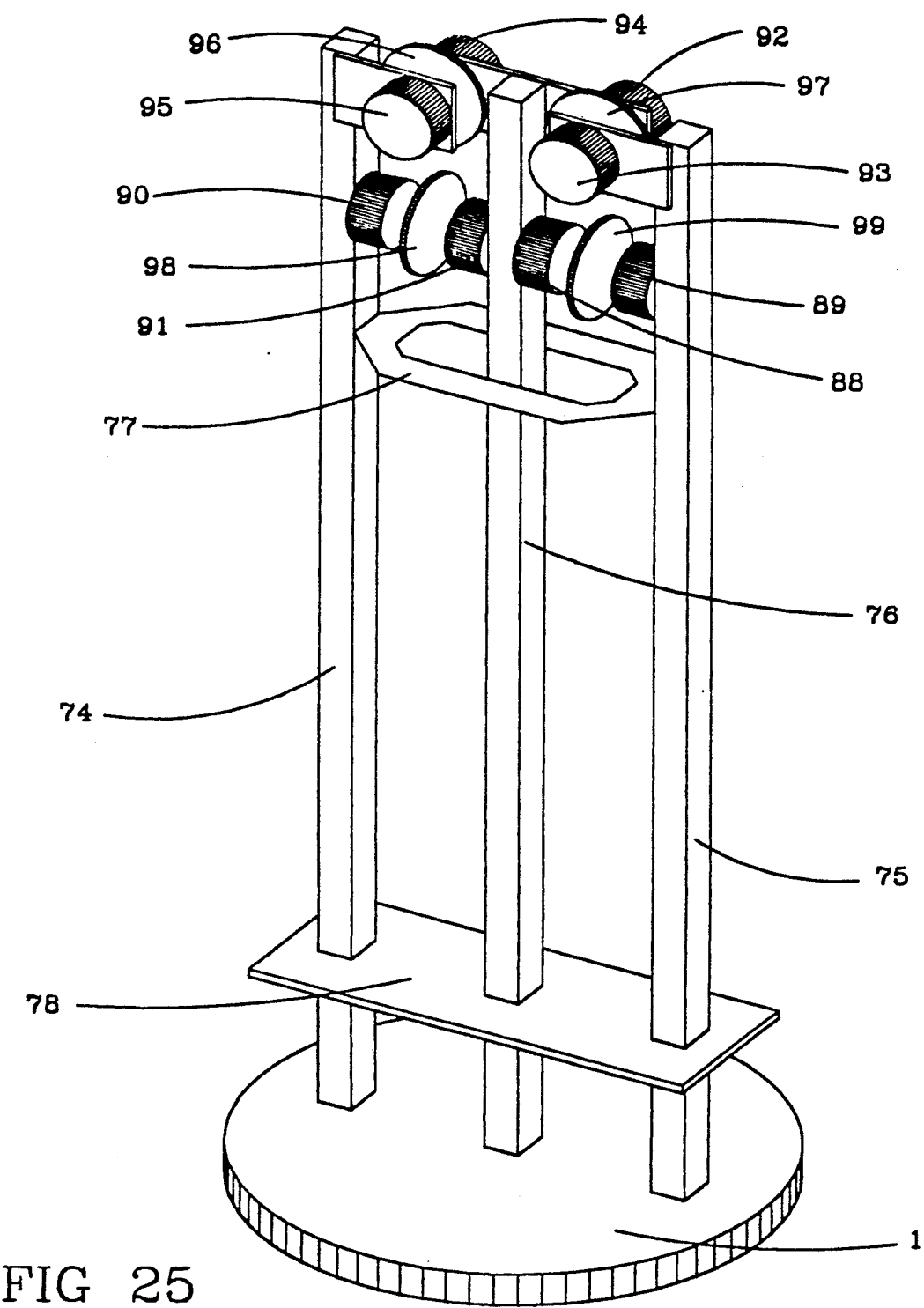
FIG. 25 is an alternative arrangement using three tynes.

FIG. 25 is an exemplary embodiment using three tynes 74, 75 and 76 arranged to act in coaxial manner. Using this arrangement, coupling plate 78 connects tynes 74, 75 and 76 together to separate the frequency of the first in-phase mode from that of the first out-of-phase mode of vibration. In the three-tyne configuration it is necessary to include at least one cross coupling bar 77 to synchronize the motion of tyne 74 to tyne 75 for the driven and reaction modes of vibration. Magnets 88 and 89, and 90 and 91 interact with each other to form two magnetic fields (not shown) which pass through drive coils 98 and 99 to form the motion drivers for the device. Magnets 92 and 93, and 94 and 95 interact with each other to form two magnetic fields (not shown) which pass through detector coils 97 and 96 to form the motion detectors for the device. Using this arrangement the signals produced in coils 97 and 96 from gyroscopic forces would be proportionally related to the rate of turn if the driven amplitude is known or held to be constant. The coils of FIGS. 24 and 25 may be mounted to any suitable structure (not shown) in the same manner as for the embodiment of FIG. 1.

It is expressly understood that the claimed invention is not to be limited to the description of the preferred embodiment but encompasses other modifications and alterations within the scope and spirit of the inventive concept.

I claim:

1. A vibratory angular rate sensor for measuring the rate of turn of an object affixed to said sensor, said sensor comprising:
   a plurality of elongated tynes with each tyne having an end affixed to a common base and arranged about a common axis;
   drive means for vibrating said tynes with a first one of said tynes vibrating in opposition to a second one of tynes in a selected direction at a selected frequency, a first coupling means affixed to each of said tynes at a first selected distance away from said common base for providing a predetermined amount of coupling between said tynes for a first in-phase mode of vibration of said tynes for separating by a selected amount the frequency of said first in-phase mode of vibration from the frequency of a first out-of-phase mode of vibration of said tynes, and pickoff means associated with said second one of said tynes and responsive to said vibration of said second tyne for generating output signals, representing changes in the vibratory pattern of said tynes caused by the rotation of said object about said common axis.

2. The sensor of claim 1 wherein said elongated tynes have parallel longitudinal axes perpendicular to said base.

3. The sensor of claim 1 wherein said sensor comprises at least three tynes, said sensor further comprises:

a second coupling means affixed to a first pair of tynes at a second selected distance away from said common base for providing a predetermined amount of coupling between said first pair of tynes for selected modes of vibration, said second coupling means being further effective for synchronizing the motion of said tynes of said first pair for selected modes of vibration.

4. A vibratory angular rate sensor for measuring the rate of turn of an object affixed to said sensor, said sensor comprising:

a first and a second pair of elongated tynes with each tyne having ah end affixed to a common base and arranged about a common axis;

drive means for vibrating said tynes with said first pair of tynes vibrating in opposition to said second pair of tynes in a selected direction at a selected frequency, a first coupling means affixed to each of said tynes at a first selected distance away from said common base for providing a predetermined amount of coupling between said tynes for a first in-phase mode of vibration of said tynes for separating by a selected amount the frequency of said first in-phase mode of vibration from the frequency of a first out-of-phase mode of vibration of said tynes, and pickoff means associated with said tynes for generating output information representing changes in the vibratory pattern of said tynes caused by the rotation of said object about said common axis.

5. The sensor of claim 4 whereby said tyne and said pickoff means are arranged so that said output information comprises signals that are phase shifted from each other by an amount proportionally related to the rate of turn of said object.

6. The sensor of claim 4 whereby said tyne and said pickoff means are arranged so that said output information comprises at least one signal whose amplitude is proportionally related to the rate of turn of said object.

7. The sensor of claim 4 whereby said pickoff means and said drive means are arranged so that said output information comprises signals for creating a null restoration signal which is used by said drive means to stop selected vibration of said tynes.

8. The sensor of claim 4 wherein said elongated tynes have parallel longitudinal axes perpendicular to said base.

9. The sensor of claim 4 in combination with:

a second coupling means affixed to said first pair of tynes at a second selected distance away from said common base for providing a predetermined amount of coupling between said first pair of tynes for selected modes of vibration, said second coupling means being further effective for synchronizing the motion of said tynes of said first pair for selected modes of vibration.

10. The sensor of claim 9 in combination with:

a third coupling means affixed to said tynes at said second pair at a third selected distance away from said common base for providing a predetermined amount of coupling between said tynes of said second pair for selected modes of vibration, said third coupling means being further effective for synchronizing the motion of said tynes of said second pair for selected modes of vibration.

11. The sensor of claim 10 wherein said elongated tynes have parallel longitudinal axes perpendicular to the surface of said base to which said tynes are affixed.

12. The sensor of claim 4 wherein said drive means comprises:

a plurality of pairs of drive magnets affixed to said tynes with the magnet of each pair of drive magnets being positioned so that a drive magnetic field is created between the magnets comprising each of said pairs of drive magnets; and drive coils associated with each of said drive magnetic field of a first and a second pair of said drive magnets whereby a drive current flowing through said drive coils causes opposing forces in a selected direction on said tynes affixed to said pairs of drive magnets associated with said drive coils, said opposing forces being effective to vibrate said tynes affixed to said pairs of drive magnets at a selected frequency.

13. The sensor of claim 12 wherein the magnets of said pairs are arranged so that substantially no net resultant forces act on said tynes affixed to said magnets due to the interaction between said magnets.

14. The sensor of claim 4 wherein said pickoff means comprise capacitive displacement sensors.

15. The sensor of claim 12 wherein said pickoff means comprises:

a first pair of pickoff magnets affixed to said tynes and positioned so that a first pickoff magnetic field is created between said magnets of said first pickoff pair whereby selected relative motion between said tynes affixed to said pickoff magnets of said first pair causes a variation of the strength of said first pickoff magnetic field, a second pair of pickoff magnets affixed to said tynes wherein said second pair of pickoff magnets are arranged so that a second pickoff magnetic field is created between said pair of pickoff magnets of said second pair whereby selected relative motion between said tynes affixed to said second pickoff magnets of said second pair causes a variation of the strength of said second pickoff magnetic field, a first pickoff coil associated with said first pickoff magnetic field wherein variations in the strength of said first pickoff magnetic field induce signals in said first pickoff coil, and a second pickoff coil associated with said second pickoff magnetic field wherein variations in the strength of said second pickoff magnetic field induce signals in said second pickoff coil.

16. The sensor of claim 4 wherein said pickoff means comprises piezoelectric means.

17. The sensor of claim 4 wherein said drive means comprises piezoelectric means.

18. A vibratory angular rate sensor for measuring the rate of turn of an object affixed to said sensor, said sensor comprising:
- a plurality of elongated tynes arranged in a pattern about a common axis with each tyne having one end affixed to a common base, a first coupling means affixed to said tynes at a first selected distance away from said common base for providing a predetermined amount of coupling between said tynes for the first in-phase mode of vibration of said tynes and a different amount of coupling between said tynes for the first out-of-phase mode of vibration of said tynes, said first coupling means being further effective for separating by a selected amount the frequency of said first in-phase mode of vibration from the frequency of said first out-of-phase mode of vibration.
- second coupling means affixed to a first and a third one of said tynes at a second selected distance away from said common base for providing a predetermined amount of coupling between first and third tynes for selected modes of vibration of said first and third tynes, said second coupling means being further effective for synchronizing the motion of said first and third tynes for selected modes of vibration of said first and third tynes,
- third coupling means affixed to a second and fourth one of said tynes at a third selected distance away from said common base for providing a predetermined amount of coupling between said second and fourth tynes for selected modes of vibration of said second and fourth tynes, said third coupling means being further effective for synchronizing the motion of said second and fourth tynes for selected modes of vibration of said second and fourth tynes,
- drive means for vibrating said tynes with said first and third tynes vibrating in opposition to said second and fourth tynes in a selected direction at a selected frequency, and
- pickoff means for generating output signals representing changes in the vibratory pattern of said tynes caused by the rotation of said object about said common axis.

19. The sensor of claim 18 wherein said drive means comprises:
- a plurality of pairs of drive magnets affixed to said tynes wherein the magnet of each drive pair is positioned so that a drive magnetic field is created between the magnets comprising each drive pair, and
- drive coils associated with said drive magnetic field of each of a first and a second drive pair of said drive magnets whereby a drive current flowing through said each of said drive coils causes opposing forces in a selected direction on said tynes affixed to said pairs of drive magnets associated with said drive coils, said opposing forces being effective to vibrate said tynes at a selected frequency.

20. The sensor of claim 19 wherein the magnets of said drive pairs are arranged so that substantially no net resultant forces act on said tynes affixed to said drive magnets due to the interaction between said drive magnets.

21. The sensor of claim 18 wherein said pickoff means comprise capacitive displacement sensors.

22. The sensor of claim 19 wherein said pickoff means comprises:
- a first pair of pickoff magnets affixed to said tynes wherein said first pair of pickoff magnets are positioned so that a first pickoff magnetic field is created between said magnets of said first pickoff pair whereby selected relative motion between said tynes affixed to said pickoff magnets of said first pair causes a variation of the strength of said first pickoff magnetic field,
- a second pair of pickoff magnets affixed to said tynes wherein said second pair of pickoff magnets are arranged so that a second pickoff magnetic field is created between said second pair of pickoff magnets whereby selected relative motion between said tynes affixed to said second pickoff magnets of said second pair causes a variation of the strength of said second pickoff magnetic field,
- a first pickoff coil associated with said first pickoff magnetic field wherein variations in the strength of said first pickoff magnetic field induce signals in said first pickoff coil, and
- a second pickoff coil associated with said second pickoff magnetic field wherein variations in the strength of said second pickoff magnetic field induce signals in said second pickoff coil.

23. The sensor of claim 18 wherein said first group of pickoff magnets and said second group of pickoff magnets are arranged so that substantially no net resultant forces act on said tynes from the interaction of the magnets in said first group of pickoff magnets and from the magnets in said second group of pickoff magnets.

24. The sensor of claim 18 wherein the tyne material is selected from a group consisting of 304 stainless steel, 316 stainless steel, low expansion 43-PH by Carpenter Technology Corporation, Ni-Span-C by International Nickel Co., Moncl 400, quartz, silicon, piezoelectric ceramics.

25. The sensor of claim 18 in combination with damping means for dissipating a selected amount of vibrational energy of said tynes from selected modes of vibration for reducing unwanted vibrations of said tynes.

26. The sensor of claim 25 wherein said damping means comprises at least one conductive path associated with at least one of said magnetic fields whereby said conductive path acts as an eddy current break to add a selected amount of damping to selected modes of vibration.

27. The sensor of claim 18 wherein said pickoff means are located substantially at the nodal locations of said tynes for the second out-of-phase modes of vibration of said tynes.

28. The sensor of claim 25 wherein said damping means comprises active circuit and drive elements which cause restoration forces on said vibrating tynes in opposition to a selected motion of said tynes.

29. The sensor of claim 18 wherein said elongated tynes have parallel longitudinal axes perpendicular to said base.

30. The sensor of claim 18 wherein said drive means and said pickoff means comprise piezoelectric elements.

31. A method of operating a vibratory angular rate sensor for measuring the rate of turn of an object affixed to said sensor, said method comprising the steps of:

affixing an end of each of a plurality of elongated tynes to a common base with said tynes being arranged about a common axis;

vibrating a first one of said tynes in opposition to a second one of tynes in a selected direction at a selected frequency, affixing a first coupling means to each of said tynes at a first selected distance away from said common base for providing a predetermined amount of coupling between said tynes for a first in-phase mode of vibration of said tynes for separating by a selected amount the frequency of said first in-phase mode of vibration from the frequency of a first out-of-phase mode of vibration of said tynes, and associating pickoff means with said second one of said tynes for generating output signals representing changes in the vibratory pattern of said tynes caused by the rotation of said object about said common axis.

32. The method of claim 31 wherein said elongated tynes have parallel longitudinal axes perpendicular to said base.

33. The method of claim 31 wherein said sensor comprises at least three tynes.

34. A method of operating a vibratory angular rate sensor for measuring the rate of turn of an object affixed to said sensor, said method comprising the steps of:

affixing one end of each of a first and a second pair of elongated tynes to a common base about a common axis;

vibrating said first pair of tynes in opposition to said second pair of tynes in a selected direction at a selected frequency, affixing a first coupling means to each of said tynes at a first selected distance away from said common base for providing a predetermined amount of coupling between said tynes for a first in-phase mode of vibration of said tynes for separating by a selected amount the frequency of said first in-phase mode of vibration from the frequency of a first out-of-phase mode of vibration of said tynes, and generating output signals in pickoff means associated with said tynes with said output signals representing changes in the vibratory pattern of said tynes caused by the rotation of said object about said common axis.

35. The method of claim 34 wherein said elongated tynes have parallel longitudinal axes perpendicular to said base.

36. The method of claim 34 in combination with the step of:

affixing a second coupling means to said first pair of tynes at a second selected distance away from said common base for providing a predetermined amount of coupling between said first pair of tynes for selected modes of vibration, said second coupling means being further effective for synchronizing the motion of said tynes of said first pair for selected modes of vibration.

37. The method of claim 36 in combination with the step of:

affixing a third coupling means to said tynes of said second pair at a third selected distance away from said common base for providing a predetermined amount of coupling between said tynes of said second pair for selected modes of vibration, said third coupling means being further effective for synchronizing the motion of said tynes of said second pair for selected modes of vibration.

38. The sensor of claim 36 wherein said elongated tynes have parallel longitudinal axes perpendicular to said base.

39. The sensor of claim 34 wherein said step of vibrating comprises the steps of:

affixing a plurality of pairs of drive magnets to said tynes with the magnet of each pair of drive magnets being positioned so that a drive magnetic field is created between the magnets comprising each of said pairs of drive magnets; and associating drive coils with each of said drive magnetic field of a first and a second pair of said drive magnets whereby a drive current flowing through said drive coils causes opposing forces in a selected direction on said tynes affixed to said pairs of drive magnets associated with said drive coils, said opposing forces being effective to vibrate said tynes affixed to said pairs of drive magnets at a selected frequency.

40. The method of claim 39 wherein said step of generating output signals comprises the steps of:

affixing a first pair of pickoff magnets to said tynes positioned so that a first pickoff magnetic field is created between said magnets of said first pickoff pair whereby selected relative motion between said tynes affixed to said pickoff magnets of said first pair causes a variation of the strength of said first pickoff magnetic field, affixing a second pair of pickoff magnets to said tynes wherein said second pair of pickoff magnets are arranged so that a second pickoff magnetic field is created between said pair of pickoff magnets of said second pair whereby selected relative motion between said tynes affixed to said second pickoff magnets of said second pair causes a variation of the strength of said second pickoff magnetic field, associating a first pickoff coil with said first pickoff magnetic field wherein variations in the strength of said first pickoff magnetic field induce signals in said first pickoff coil, and associating a second pickoff coil with said second pickoff magnetic field wherein variations in the strength of said second pickoff magnetic field induce signals in said second pickoff coil.

41. A method of operating a vibratory angular rate sensor for measuring the rate of turn of an object affixed to said sensor, said method comprising the steps of:

arranging a plurality of elongated tynes in a pattern about a common axis with each tyne having one end affixed to a common base, affixing a first coupling means to said tynes at a first selected distance away from said common base for providing a predetermined amount of coupling between said tynes for the first in-phase mode of vibration of said tynes and a different amount of coupling between said tynes for the first out-of-phase mode of vibration of said tynes, said first coupling means being further effective for separating by a selected amount the frequency of said first in-phase mode of vibration from the frequency of said first out-of-phase mode of vibration, affixing second coupling means to a first and a third one of said tynes at a second selected distance away from said common base for providing a predetermined amount of coupling between first and third tynes for selected modes of vibration of said first and third tynes, said second coupling means being further effective for synchronizing the motion of said first and third tynes for selected modes of vibration of said first and third tynes, affixing third coupling means to a second and fourth one of said tynes at a third selected distance away from said common base for providing a predetermined amount of coupling between said second and fourth tynes for selected modes of vibration of said second and fourth tynes, said third coupling means being further effective for synchronizing the motion of said second and fourth tynes for selected modes of vibration of said second and fourth tynes, vibrating said first and third tynes in opposition to said second and fourth tynes in a selected direction at a selected frequency, and generating output signals in pickoff means with said signals representing changes in the vibratory pattern of said tynes caused by the rotation of said object about said common axis.

42. The method of claim 41 wherein said step of vibrating comprises the steps of:

affixing a plurality of pairs of drive magnets to said tynes wherein the magnet of each drive pair is positioned so that a drive magnetic field is created between the magnets comprising each drive pair, and associating drive coils with said drive magnetic field of each of a first and a second drive pair of said drive magnets whereby a drive current flowing through said each of said drive coils causes opposing forces in a selected direction on said tynes affixed to said pair of drive magnets associated with said drive coils, said opposing forces being effective to vibrate said tynes at a selected frequency.

43. The method of claim 42 wherein said step of generating output signals comprises the steps of:

affixing a first pair of pickoff magnets to said tynes wherein said first pair of pickoff magnets are positioned so that a first pickoff magnetic field is created between said magnets of said first pickoff pair whereby selected relative motion between said tynes affixed to said pickoff magnets of said first pair causes a variation of the strength of said first pickoff magnetic field, affixing a second pair of pickoff magnets to said tynes wherein said second pair of pickoff magnets are arranged so that a second pickoff magnetic field is created between said second pair of pickoff magnets whereby selected relative motion between said tynes affixed to said second pickoff magnets of said second pair causes a variation of the strength of said second pickoff magnetic field, associating a first pickoff coil with said first pickoff magnetic field wherein variations in the strength of said first pickoff magnetic field induce signals in said first pickoff coil, and associating a second pickoff coil with said second pickoff magnetic field wherein variations in the strength of said second pickoff magnetic field induce signals in said second pickoff coil.

* * * * *